Aug. 22, 1961
P. BETTS ET AL
2,997,412
METHODS OF CODE DRUM CONSTRUCTION
Filed Feb. 25, 1957
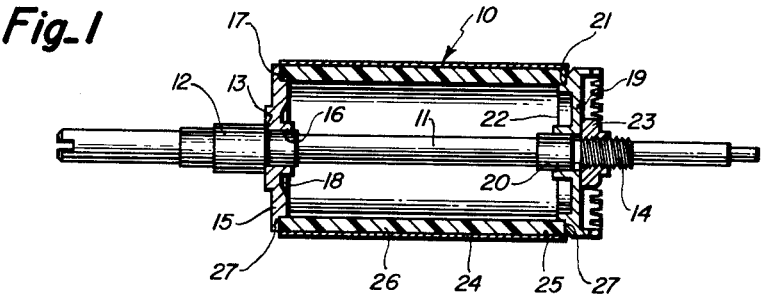
Fig.1
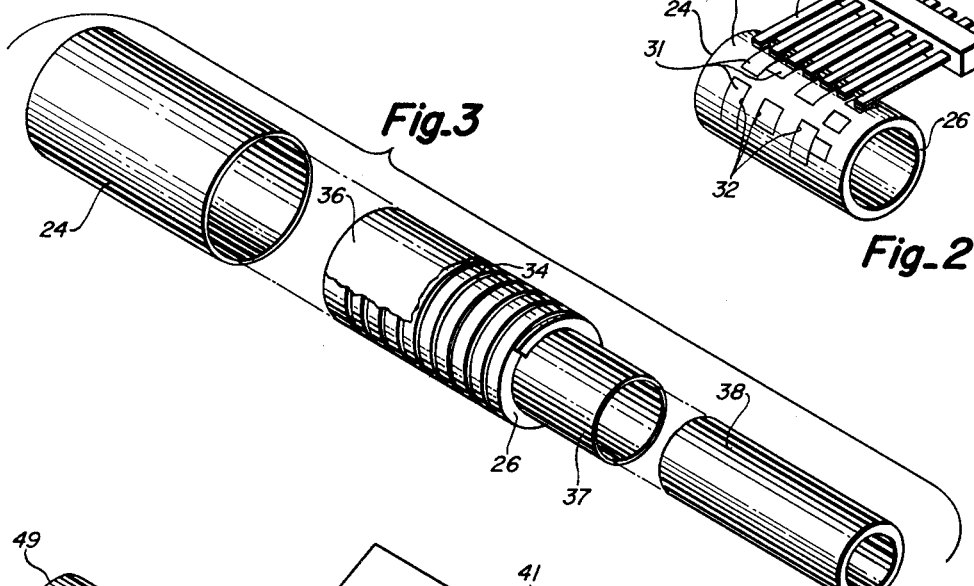
Fig.2
Fig.3
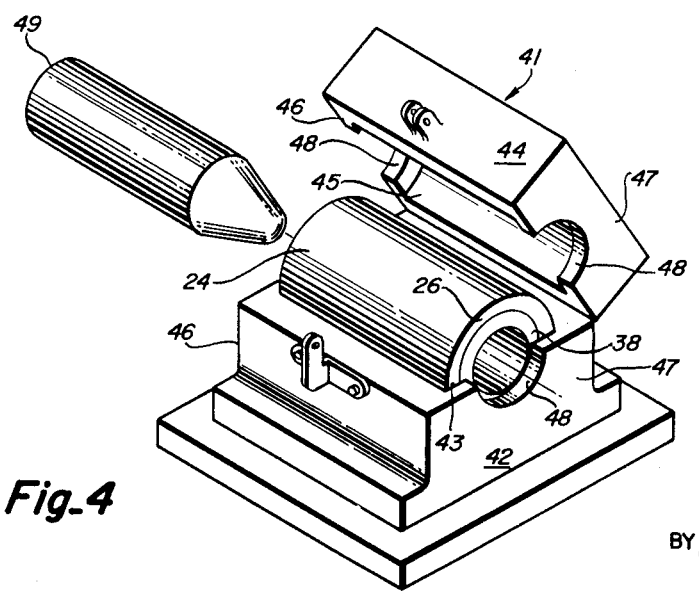
Fig.4
INVENTORS
PETER BETTS
JOSEPH S. LORD
BY Thomas S. Ross
Joseph R. Spalla
ATTORNEYS

United States Patent Office 2,997,412
Patented Aug. 22, 1961

2,997,412
METHODS OF CODE DRUM CONSTRUCTION
Peter Betts, Oakland, Calif., and Joseph S. Lord, Walpole, Mass., assignors to Instrument Development Laboratories, Inc., Attleboro, Mass., a corporation of New York
Filed Feb. 25, 1957, Ser. No. 641,899
5 Claims. (Cl. 154—2.28)

This invention relates to drums having electrically conducting and non-conducting areas in the surfaces thereof representing a desired coding arrangement; more particularly it relates to methods of constructing drums on whose surfaces conducting codes are to be reproduced; and specifically it relates to a method of concentrically bonding tubular insulating materials securely to concentric tubular conductive materials to form lightweight drums on whose surfaces conducting codes may be photographically reproduced.

Code drums of the above referred to type require an electrically conducting outer shell which must exist in such fashion that it is above ground electrically i.e. electrically isolated from the structure of the instrument of which it is to be a part. It follows then, that to isolate the conducting shell above ground it must be joined or bonded to a non-conducting support tube. It is necessary however, that the bond between shell and tube be very secure such that when predetermined surface areas of the conducting shells are engraved or etched away to form a code, the resulting or remaining separate islands of shell material will be properly retained in fixed relation to one another, particularly at relatively high speeds of rotation. Further, in-as-much as a number of drums, each representing a particular order of increments, are required in a digitalizer, and each drum following the first in a series is intermittently driven whereby discrete readouts may be obtained, it is necessary that the weight of the drums be negligible in order to minimize reflected inertias and attain maximum smoothness of operation.

This invention therefore relates to methods of bonding concentric cylinders of electrically conducting and non-conducting materials whereby the bond between them is more than adequate to withstand later processing operations as well as operating stresses, either thermal, mechanical or electrical. Further the drums comprising conducting and non-conducting cylinders bonded in accordance with the methods of the invention are not only of minimum weight and intertia but possess optimum strength.

The conductive and non-conductive cylinders are bonded in accordance with the invention by coating either the inner surface of the former, or the outer surface of the latter, or both, with a thermo-setting resin after the non-conductive cylinder has been rendered radially expansible; telescoping said cylinders, constraining the conducting outer cylinder against radial expansion and both cylinders against axial expansion, and thereafter applying outwardly directed radial pressures uniformly about the inner surface of said non-conducting cylinder whereby it expands toward the constrained outer member thereby bringing its resin coated outer surface in tight pressure contact with the inner surface of said conducting cylinder; and curing said thermo setting resin while said cylinders are under stress. Thereafter desired coding arrangements which per se do not form part of this invention may be reproduced on the conductive cylinders by conventional or otherwise suitable photo-engraving processes.

It is an object of the invention therefore to provide a compact lightweight electrically coded drum which can be inexpensively manufactured.

Another object of the invention is the provision of a method for producing a small lightweight compact cylindrical coded drum possessing a minimum wall thickness together with optimum strength.

Another object of the invention is the provision of a method for producing a coded drum which has negligible inertia.

Another object of the invention is the provision of a method for securely concentrically bonding a conducting shell to a non-conductive supporting tube whereby the bond will withstand later processing operations, and thermal, mechanical, and electrical operating stresses.

Still another object of the invention is in the provision of a method for concentrically bonding a conducting shell to a supporting tube such that when the conducting shell is etched into separate isolated islands of shell material to form a code, the islands will remain fixed relative to one another at relatively high speeds of rotation of the bonded shell and tube.

A further object of the invention is to provide a mechanical method of applying a high uniform radial pressure across the bond between concentric shells of electrically conducting and non-conducting materials during the final curing of the material comprising the bond.

Other objects and many attendant advantages of this invention will be readily appreciated as the same becomes better understood by reference to the following detailed description when considered in connection with the accompanying drawings in which like reference numerals designate like parts throughout the figures thereof and wherein:

FIG. 1 is a cross sectional view of the manner in which a coded drum constructed in accordance with the invention is mounted in electrically isolated relationship on a shaft;

FIG. 2 is a perspective view of a coded drum;

FIG. 3 is an exploded perspective view showing steps in the method for constructing conductive drums in accordance with the invention; and FIG. 4 is a perspective view showing steps in the method for constructing conductive drums that are performed subsequent to those shown in FIG. 3.

Referring now to the drawings wherein like reference characters designate like or corresponding parts throughout the several views there is shown in FIG. 1 a cylindrical lightweight minimum intertia drum generally designated by reference numeral 10 constructed in accordance with the invention which is fixedly mounted for rotation with and electrically isolated from a shaft 11 adapted for rotation in a digitalizer assembly. The shaft 11 is provided with an enlarged portion 12 adjacent one of its ends thereby forming a shoulder 13 and with a threaded portion 14 adjacent the other of its ends. A front end plate 15 of a material having high impact resistance and tensile strength such as hardened steel provided with a central bore 16 is mounted on said shaft with its outer face abutting the shoulder 13. The front end plate 15 also has an annulus 17 cut into the peripheral edge of its inner face 18. A rear end plate 19 also provided with a central bore 20 and an annulus 21 cut into the peripheral edge of its inner face 22, is mounted on said shaft 11 in the vicinity of said threaded portion whereby, upon threading a nut 23 or the like on the threaded portion said end plates 15 and 19 are urged together thereby to securely hold between them the cylindrical drum 10 mounted on said annulae.

The drum 10 comprises a concentrically machined, uniform thickness, relatively thin, cylindrical shell 24 of electrically conductive material suitable for photo-engraving, such as copper, and preferably an oxygen free high conductivity copper, which is securely bonded along its inner surface 25 to the outer surface areas of a concentric cylindrical support tube 26 of electrical insulating material. While many types of insulating material would serve, an insulating material amenable to machining is preferred such as one formed from epoxy bonded glass fibers.

As clearly seen in FIG. 1 only the edges 27 of the support tube 26 of insulating material about the annulae 17 and 21 in the front and end plates thereby holding the conductive shell 24 in electrically isolated relationship from the shaft 11.

Referring now to FIG. 2 the surface 28 of the conductive cylindrical shell 24 is divided into a plurality of separated electrically isolated islands 31 arranged in accordance with a desired code e.g. a binary code. Although the method of reproducing the code on the drum surface does not per se form part of this invention, for purposes of this disclosure the drum surface is divided into isolated islands 31 by removing down to the non-conductive cylindrical tube 26, the conductive material of the shell as by etching, along line portions 32 forming the boundaries of the islands 31. As is apparent current introduced to the drum 10 as by a common brush 33 will flow around the isolated islands 31 with the result that any brush orders e.g. $2^0$—$2^n$ contacting isolated islands will not carry current to a utilization circuit.

In a specific embodiment code drums were employed which had an overall length of 1⅛ inches, an outside diameter of 650 thousandths and an inner diameter of 585 thousandths of an inch. Of the 65 thousandths thickness, the conducting shell was only approximately five thousandths. It may be seen therefore that a very secure bond between the conducting shell 24 and its nonconducting tubular support 26 is mandatory, particularly since the areas bonding the isolated islands 31 to the support tube 26 is small, and the drum 10 is required to rotate at relatively high speeds.

The method for securely bonding a conducting shell to a support tube of insulating material is shown in FIGS. 3 and 4. The first step in the method is to cut by any suitable means, such as high speed slotting sows, a helical slot 34 through the wall of the tube 26 and extending from end to end thereof thereby forming it into a helix whereby the tube can be radially expanded and contracted to a desired degree depending on the number of coils per unit length. In the specific embodiment 4 coils per inch was found suitable. The outer surface of the tube 26 and the inner surface of the conductive cylindrical shell 24 are then coated as by a brush with a heat hardenable or thermo-setting resin 36 many of which are known to the art. The thermo-setting resin 36 is allowed to dry and the coated tube 26 is thereafter inserted into the cylindrical conductive shell 24. The outer diameter of the coated tube 26 is substantially equal to the inner diameter of the conducting shell 24 whereby after insertion of the tube 26 its resin coated surface is in contact with the resin coated inner surface of the conductive shell 24. Since the helically slotted tube 26 will contract axially when expanded radially it is made longer than the conductive shell by an amount such that the lengths of both shell and tube will be substantially equivalent after radial expansion of the slotted tube. Where necessary a very thin sleeve 37 capable of expansion such as "Teflon" may be then inserted within and in contact with the inner surface of tube 26 for reasons to be disclosed infra. Thereafter a tube 38 of compressible material such as rubber is inserted within the "Teflon" sleeve 37. In practice, in order not to disturb the "Teflon" sleeve within the tube 26, the rubber tube may be stretched and pulled through the "Teflon" sleeve and then released so that it fits snugly in contacting relation with the "Teflon" sleeve.

Referring now to FIG. 4 the drum, assembled as described supra is placed in any suitable constraining jig generally designated by reference numeral 41 or the like to prevent the assembly from expanding radially and also axially. As shown in FIG. 4 the jig comprises a base portion 42 having a semi-cylindrical cavity 43 formed therein, and a hinged cover portion 44 having a semi-cylindrical cavity 45 therein complementary to cavity 43. Opposite ends 46 and 47 of both the base and cover portions are also provided with complementary semi-cylindrical openings 48. When the jig 41 is closed the diameter of the complementary semi-cylindrical cavities 43 and 45 is equivalent to the outer diameter of the conductive shell 24 of the assembly and the lengths thereof are equivalent to the length of the conductive shell. The diameter of the complementary openings 48 in the opposite ends 46 and 47 of the base and cover portions as clearly shown in the figure are slightly greater than the bore of the compressible tube 38 but less than its outer diameter for reasons which will be apparent infra.

After inserting the drum assembly in and closing the constraining jig 41 a mandrel 49 or the like having a generous taper on one end and having a diameter equivalent to the complementary semi-cylindrical openings 48 is inserted into said openings and forced through the bore of the compressible rubber tube 38. In-as-much as the diameter of the complementary semi-cylindrical openings 48 are less than the outer diameter of the rubber tube 38 the latter is prevented from moving out of the jig 41. The shear stresses set up in the compressible rubber tube 38 as the mandrel 49 moves through the bore of the assembly are relieved by backing the mandrel up a proper amount.

With the mandrel so disposed within the assembly it is apparent that the rubber tube is compressed. The compression forces cause the helically slotted tube 26 to expand tightly against the inner surface of the constrained conducting shell 24 whereby the resin 36 is subjected to a large and uniform radial pressure. While the resin is under this pressure it is put through its curing cycle through application of high temperature heat by conventional means until a very secure bond is obtained between the conductive shell 24 and the tube 26 of insulating material. The bonding resin 36 simultaneously performs two functions, that of bonding the materials comprising the drum and that of integrating the helix into a structurally sound tubular member.

After the resin 36 is cured the jig 41 is opened and the mandrel 49 is removed. Since the jig no longer restrains the rubber tube 38 and "Teflon" sleeve 37 from moving out of the assembly, they follow the mandrel, and follow easily because of the "Teflon" sleeve overlying the rubber tube.

Finally to further reduce the weight of the completed conductive drum, if desired and/or to assure a perfectly concentric cylinder of uniform thickness, any excess fibreglass may be removed from the inner surface of the fibreglass cylinder by machining.

The drum constructed as above described is then ready for later processing operations such as coding. Coding the drum may be carried out by techniques known to those skilled in the printed circuit art. For example, the drum may be coded by first coating it with a light sensitive photographic emulsion; exposing said emulsion to a desired pattern; developing the exposed portion and washing off undeveloped portions thereby leaving portions of the conductive surface exposed, and thereafter etching away said exposed portions.

While the conductive shell has been described as comprising the outer surface of the drum, the method is also applicable to drums wherein the conductive shell comprises the inner surface thereof. It should be understood, therefore, that the foregoing disclosure relates to only a preferred embodiment of the invention and that it is intended to cover all changes and modifications of the example of the invention herein chosen for the purpose of the disclosure which do not constitute departures from the spirit and scope of the invention.

The invention claimed is:

1. A method of making code drums having an outer conductive shell predetermined areas of which are adapted to be cut away thereby forming isolated islands of conductive material, and a dimensionally stable insulating tube for rotatively supporting said shell, said method comprising the steps of helically slotting said support tube to render it radially expandable, coating said tube with a heat hardenable resin, telescoping said tube within said shell, radially expanding said support tube over its entire length whereby said resin is subjected to a uniform pressure, and thereafter curing said resin whereby adjacent surfaces of said shell and tube are securely bonded together over their entire length and whereby said support tube is again rendered dimensionally stable.

2. A method for bonding the juxtaposed surfaces of a dimensionally stable electrically conductive tubular member and a dimensionally stable electrically insulating tubular support member having an outside diameter smaller than the inside diameter of said conductive member and being of relatively greater thickness than said conductive member, comprising the steps of rendering said insulating support member radially expandable over its entire length, coating the outer surface of said insulating member with a thermo-setting resin, telescoping said insulating member within said conductive member, confining said conductive member against radial expansion, mechanically subjecting the resin between the juxtaposed surfaces to a uniform radial pressure through radial expansion of said insulating member over its entire length, and thereafter curing said resin while said uniform radial pressure is maintained, whereby said resin will bond the juxtaposed surfaces of said members and will render said expanded insulating member dimensionally stable once again.

3. A method for bonding the juxtaposed surfaces of a dimensionally stable electrically conductive tububar member and a dimensionally stable electrically insulating tubular support member of relatively greater thickness than said conductive member, comprising the steps of helically slotting said insulating tubular member thereby to render it radially expandable over its entire length, coating the outer surface of said electrically insulating member with a thermo-setting resin, telescoping said tubular members with the support member concentrically disposed within said conductive member, confining said conductive tubular member against radial expansion, mechanically subjecting said resin between the juxtaposed surfaces of said members to a uniform radial pressure through radial expansion of said insulating member over its entire length, and thereafter curing said resin while said uniform radial pressure is maintained, whereby said resin bonds the juxtaposed surfaces of said members and the coils of said helically slotted insulating member.

4. The method of producing a lightweight substantially inertialess code drum having a shell of electrically conductive material bonded to a dimensionally stable support tube of insulating material of relatively greater thickness than said shell whereby said shell will be supported by said tube and electrically insulated from an instrument of which it is to be a part, said shell surface being adapted to be cut away at selected portions thereby to form a code, said bond between shell and tube being such that remaining areas of shell material will be retained in fixed relation to one another at high speeds of rotation of said drum, said method comprising the steps of helically slotting said tube to render it radially expandable, coating said tube with a thermosetting resin, telescoping a compressible member within said insulating tube, constraining said shell against radial expansion and the ends of said shell said insulating tube and said compressible member against axial movement, inserting a mandrel within said compressible member whereby said insulating tube expands against said shell thereby subjecting said resin to a uniform radial pressure, and thereafter curing said resin.

5. A lightweight minimum inertia open ended tubular code drum adapted to be rotated at relatively high speeds, said drum comprising a tubular shell of electrically conductive material, an essentially non-expandable support tube of electric insulating material concentrically disposed within said shell, means permanently bonding said shell and tube, said shell surface being selectively cut away internally of its ends whereby axially extending columnar codes comprising conductive and electrically isolated areas are formed, said conductive areas being adapted to carry current introduced to the shell to brushes riding thereon and said isolated areas being adapted to block current introduced to the shell to brushes riding thereon, said bond being such that said electrically isolated areas of shell material resulting from said coding will be retained in proper relation to one another at relatively high speeds of rotation of said drum, a drive shaft, and means for securing said drum for rotation with and electrically isolating the shell of said drum from said drive shaft.

References Cited in the file of this patent

UNITED STATES PATENTS

| | | |
|---|---|---|
| 746,630 | Greenfield | Dec. 8, 1903 |
| 1,728,786 | Colby | Sept. 17, 1929 |
| 2,440,725 | Munger | May 4, 1948 |
| 2,461,061 | Kollmann | Feb. 8, 1949 |
| 2,493,153 | Martin | Jan. 3, 1950 |
| 2,745,778 | Garten | May 15, 1956 |
| 2,789,934 | Busbach | Apr. 23, 1957 |
| 2,808,450 | Peters | Oct. 1, 1957 |

FOREIGN PATENTS

| | | |
|---|---|---|
| 693,093 | Germany | July 2, 1940 |